United States Patent
Yi et al.

(10) Patent No.: US 7,204,013 B2
(45) Date of Patent: Apr. 17, 2007

(54) METHOD OF MANUFACTURING A MAGNETORESISTIVE SENSOR

(75) Inventors: Ge Yi, Londonderry (GB); Suguo Huo, Londonderry (GB)

(73) Assignee: Seagate Technology LLC, Scotts Valley, CA (US)

( * ) Notice: Subject to any disclaimer, the term of this patent is extended or adjusted under 35 U.S.C. 154(b) by 147 days.

(21) Appl. No.: 10/629,028

(22) Filed: Jul. 29, 2003

(65) Prior Publication Data

US 2005/0024781 A1 Feb. 3, 2005

(51) Int. Cl.
*G11B 5/187* (2006.01)
*C23C 14/48* (2006.01)

(52) U.S. Cl. .............................. 29/603.13; 29/603.14; 29/603.08; 360/322; 360/324.2; 427/523; 427/529; 427/530; 428/811.1; 204/192.1; 204/192.11

(58) Field of Classification Search ............. 29/603.13, 29/603.14, 603.08; 360/322, 324.2, 324.4, 360/324; 427/523, 525, 529, 530; 428/811, 428/811.1; 204/192.1, 192.5, 192.2, 192.11; 148/101; 438/694
See application file for complete search history.

(56) References Cited

U.S. PATENT DOCUMENTS

| | | | |
|---|---|---|---|
| 4,764,478 A | 8/1988 | Hiruta | 437/29 |
| 5,192,618 A * | 3/1993 | Frankel et al. | 148/101 X |
| 5,406,434 A | 4/1995 | Amin et al. | 360/126 |
| 5,936,402 A | 8/1999 | Schep et al. | 324/252 |
| 6,054,023 A | 4/2000 | Chang et al. | 204/192.2 |
| 6,368,425 B1 * | 4/2002 | Segar et al. | 427/530 X |
| 6,383,574 B1 | 5/2002 | Han et al. | 427/526 |
| 6,411,478 B1 * | 6/2002 | Mao et al. | 360/324.2 |
| 6,417,999 B1 * | 7/2002 | Knapp et al. | 360/322 |
| 6,501,143 B2 | 12/2002 | Sato et al. | 257/421 |
| 6,515,341 B2 | 2/2003 | Engel et al. | 257/421 |
| 6,737,286 B2 * | 5/2004 | Tao et al. | 438/694 X |
| 2002/0094374 A1 | 7/2002 | Han et al. | 427/128 |

FOREIGN PATENT DOCUMENTS

JP 5-271904 * 10/1993 ................. 427/530

(Continued)

OTHER PUBLICATIONS

Sung et al., "Three Types of 2-D Lateral Magnetoresistive Sensors with P+—Implant Confinement", IEEE Proceedings Circuits and Devices and Systems, vol. 147, Issue 3, pp. 158-164, Jun. 2000.*

(Continued)

*Primary Examiner*—A. Dexter Tugbang
(74) *Attorney, Agent, or Firm*—Westman, Champlin & Kelly, P.A.

(57) ABSTRACT

In a method of forming a magnetoresistive sensor, first and second magnetic leads are formed. Next, a junction of magnetic and electrically conductive material is formed between the first and second magnetic leads. Finally, the magnetic and electrical conductivity of an outer shell portion of the junction is reduced to form a constricted junction comprising a magnetic and electrically conductive junction core that is at least partially surrounded by the outer shell portion. Another aspect of the present invention is directed to the magnetoresistive sensor that is formed using the method.

19 Claims, 5 Drawing Sheets

FOREIGN PATENT DOCUMENTS

WO    WO 02/095434 A1    11/2002

OTHER PUBLICATIONS

H.D. Chopra and S.Z. Hua, "Ballistic Magnetoresistance over 3000% in Ni nanicontacts at room temperature," Phys. Rev. B66 (2002) 020403R.

G. Prinz, "Magnetoelectronics," Science 282 (1998) 1660.

S.H. Chung et al., "Universal Scaling of Ballistic Magnetoresistance in Magnetic nanocontacts," Phy. Rev. Lett. 89 (2002) 287203.

P. Bruno, "Geometrically Constrained Magnetic Wall," Phys. Rev. Lett. 83 (1999) 2425.

N. Garcia et al., "Magnetoresistance in excess of 200% in Ballistic Ni Nanocontacts at Room Temperature and 100 Oe," Phys. Rev. Lett. 82 (1999) 2923.

G. Tatara et al., "Domain Wall Scattering Explains 300% Ballistic Magnetoconductance of Nanocontacts," Phys. Rev. Lett. 83 (1999) 2030.

M. Munoz et al., "Ballistic magnetoresistance in a nanocontact between a Ni cluster and a magnetic thin film," Appl. Phys. Lett. 79 (2001) 2946.

Kaminsky et al., "Patterning ferromagnetism in $Ni_{80}FE_{20}$ films using $Ga^+$ion irradiation," Appl. Phys. Lett. 78 (2001) 1589.

C. Chappert et al., "Planar Patterned Magnetic media obtained by ion irradiation," Science, 280 (1998) 1919.

Fadei Komarov ed., "Ion beam Modification of Metals," OPA (Amsterdam) 1992, p. 130.

Phil Schewe et al., "Ballistic Magnetoresistance," Physics News Update (2002) 1 page.

"Ballistic Magnetoresistance," Physics News Graphics, (2002), 3 pages.

R. Colin Johnson, Nanocontacts could make hard drives go 'ballistic,' The Work Circuit, 4 pages (May 27, 2003).

Roger D. Pease et al., "The Future of Memory and Storage Technology," ELEC 694 (2002).

* cited by examiner

METHOD OF MANUFACTURING A MAGNETORESISTIVE SENSOR

FIELD OF THE INVENTION

The present invention relates to magnetoresistive sensors and, more particularly, but not by limitation to constricted junctions of magnetoresistive sensors that can be used to form ballistic magnetoresistive sensors.

BACKGROUND OF THE INVENTION

A magnetoresistive (MR) sensor exhibits a change in electrical resistance as a function of an external magnetic field. This property allows MR sensors to be used as magnetic field sensors and read heads in magnetic storage systems including disc drives and random-access-memories.

In disc drive storage systems, the read head is typically merged with a writer head. The writer writes encoded information to a magnetic storage medium, which is usually a disc coated with hard magnetic films. In a read mode, a magnetic domain representing a bit of data on the disc modulates the resistance of the MR sensor as the magnetic domain passes below the read head. The change in resistance can be detected by passing a sensing current through the MR sensor and measuring the voltage across the MR sensor. The resultant signal can be used to recover the recorded data from the disc.

MR sensors utilize various MR effects, such as giant magnetoresistance (GMR) and tunneling magnetoresistance (TMR). The structure of the MR sensor varies depending upon the MR effect being utilized. GMR sensors in the form of "spin valves" are generally favored by the disc drive industry. Spin valves generally consist of a free ferromagnetic layer having a magnetization that rotates in response to an applied magnetic field, a conductive spacer, and a pinned ferromagnetic layer whose magnetization has a fixed orientation. The electrical resistance of the spin valve is a function of the angle between the magnetizations of the free ferromagnetic layer and the pinned ferromagnetic layer. The spin valve is most resistive when the two layers are magnetized in anti-parallel directions, and is the most conductive when they are parallel.

A TMR sensor utilizes a TMR junction that is very similar to a spin valve in the sense that it also consists of a ferromagnetic free layer, a spacer, and a pinned ferromagnetic layer. The magnetoresistance effect rises from the angular difference between the magnetizations of the two magnetic layers in a way that is analogous to the spin valve. A major difference between the TMR junction and the spin valve is that the spacer in the TMR junction is made of an insulator, typically aluminum-oxide, instead of a conductor. Moreover, in conventional TMR sensors, the electrical current is perpendicular to the plane of the films as opposed to in the plane of the films for GMR sensors.

There is a never-ending demand for higher data storage capacity in disc drives. One measure of the data storage capacity of a disc drive is the areal density of the bits at which the disc drive is capable of reading and writing. The areal density is generally defined as the number of bits per unit length along a track (linear density in units of bits per inch) multiplied by the number of tracks available per unit length in the radial direction of the disc (track density in units of track per inch or TPI).

A goal of present magnetic recording research is to achieve terabit ($10^{12}$)-per-square-inch areal density. Such a high areal density requires a significant decrease in the size of the magnetic domains that define the bits of data, which also reduces the magnitude of the magnetic field they generate. Accordingly, the read sensor that is used to detect the magnetic field must be highly sensitive (i.e., exhibit a large magnetically induced change in resistance in response to an applied magnetic field) in order to properly detect the magnetic domains. Unfortunately, the sensitivities of GMR sensors (approximately 25% maximum resistance change) and TMR sensors (approximately 40% maximum resistance change) are believed to be insufficient for use in reading data that has been recorded at a terabit areal density.

One promising MR effect that could be used to form a read sensor having a sufficient sensitivity to enable reading of terabit areal density magnetic recordings is the ballistic magnetoresistance (BMR) effect. Such BMR sensors have exhibited sensitivities that are on the order of a 3,000% magnetically induced change in resistance in response to an applied magnetic field. The BMR effect occurs in the conduction of spin-polarized electrons between magnetic leads through a highly constricted magnetic junction having a width of approximately 10 nanometers (nm). The width of the constricted junction restricts the magnetic domain wall of the constricted junction to less than the spin-flip mean free path of the electrons. When a magnetic domain wall resides in the constricted junction, the electrical resistance is much larger than it is after an external magnetic field is applied to substantially sweep out the domain wall. The resulting magnetoresistive effect is much larger than the GMR or TMR effects.

The primary obstacle that must be overcome to form such a sensor is the formation of the constricted junction. One method involves stretching a magnetic metal rod until the desired constricted junction forms without breaking the rod. Another method involves electro-deposition of magnetic material between adjacent tips of magnetic leads until the tips are joined by the deposited material. Unfortunately, such methods are difficult to perform, produce inconsistent results, can degrade rapidly (electro-deposition method), and are generally unacceptable for mass production.

Accordingly, a need exists for MR sensors having constricted junctions that can be formed small enough to produce a BMR effect while allowing for their mass production.

SUMMARY OF THE INVENTION

The present invention is directed to a magnetoresistive (MR) sensors and constricted junctions of MR sensors that can be mass produced. One aspect of the present invention is directed to a method of forming a magnetoresistive sensor. In the method, first and second magnetic leads are formed. The first and second magnetic leads are displaced from each other. Next, a junction of magnetic and electrically conductive material is formed between the first and second magnetic leads. Finally, the magnetic and electrical conductivity of an outer shell portion of the junction is reduced to form a constricted junction comprising a magnetic and electrically conductive junction core that is at least partially surrounded by the outer shell portion. Another aspect of the present invention is directed to the magnetoresistive sensor that is formed using the above-described method.

Yet another aspect of the present invention is directed to a method of forming a constricted junction for use in a MR sensor to join first and second magnetic leads that are displaced from each other and are each formed of a magnetic and electrically conductive material. In the method, a junction of magnetic and electrically conductive material is formed to join the first and second magnetic leads. Next, the magnetic and electrical conductivity of an outer shell portion of the junction is reduced to thereby form a constricted junction comprising a magnetic and electrically conductive junction core that is at least partially surrounded by the outer shell portion. Another aspect of the present invention is directed to the constricted junction that is formed using the above-described method.

These features and benefits will become apparent with a careful review of the drawings and the corresponding detailed description.

DETAILED DESCRIPTION OF ILLUSTRATIVE EMBODIMENTS

Figure 1:
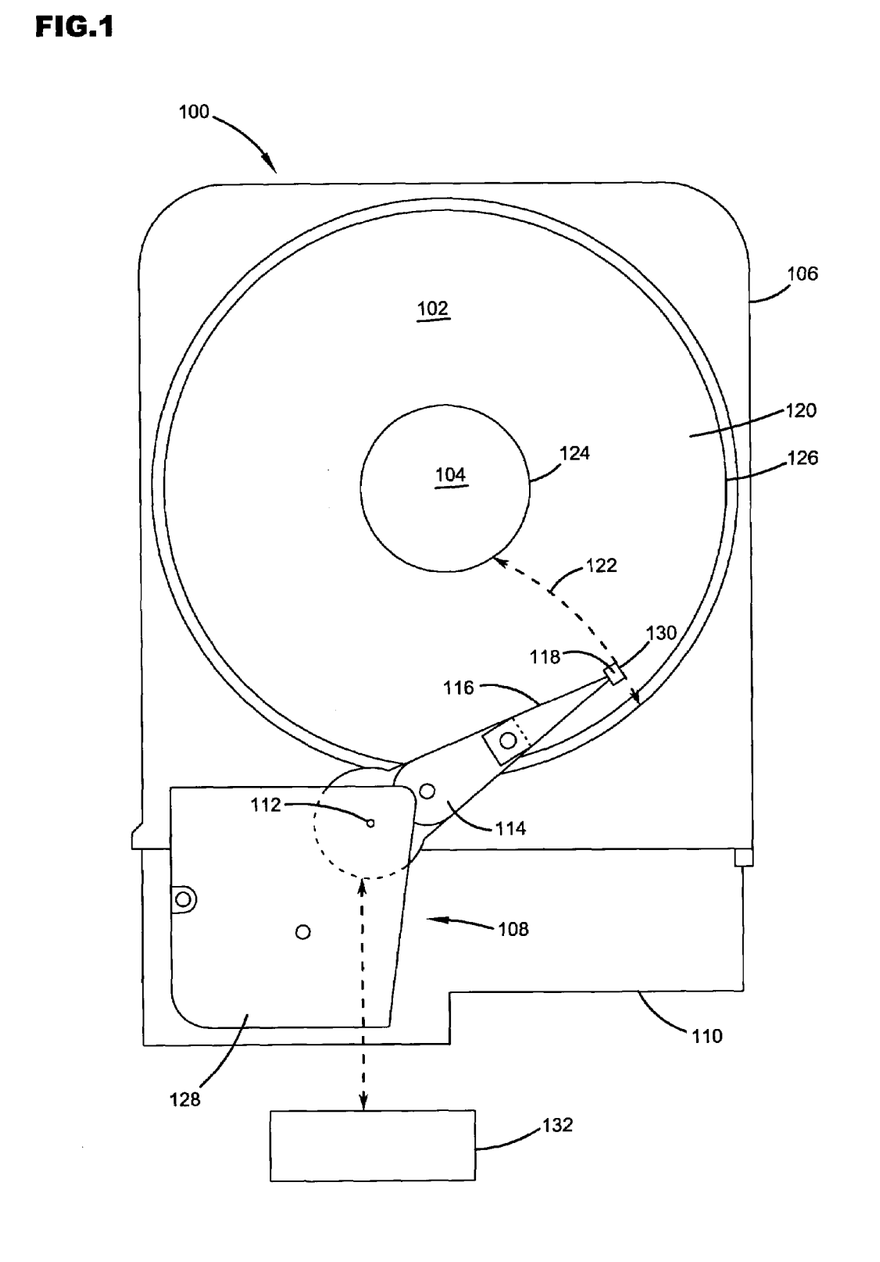
FIG. 1 is a top view of a data storage system with which embodiments of the present invention may be used.

FIG. 1 is a top view of a disc drive 100, with which embodiments of the present invention may be used. Disc drive 100 includes a magnetic disc 102 mounted for rotational movement about an axis 104 and driven by spindle motor (not shown). The components of disc drive 100 are contained within a housing that includes base 106 and a cover (not shown). Disc drive 100 also includes an actuator 108 mounted to a base plate 110 and pivotally moveable to disc 104 about axis 112. Actuator mechanism 108, includes actuator arm 114 and suspension assembly 116. Slider 118 is coupled to suspension assembly 116 through a gimbaled attachment which allows slider 118 to pitch and roll as it rides on an air bearing above surface 120 of disc 102. Actuator mechanism 108 is adapted to rotate slider 118 on arcuate path 122 between an inner diameter 124 and an outer diameter 126 of disc 102. A cover 128 can cover a portion of actuator mechanism 108. Slider 118 supports a head 130 having a magnetoresistive read sensor and a write transducing element for reading information from and writing information to disc 102.

During operation, as disc 102 rotates, air (and/or a lubricant) is dragged under air bearing surfaces (ABS) of slider 118 in a direction approximately parallel to the tangential velocity of disc 102. As the air passes beneath the bearing surfaces, air compression along the air flow path causes the air pressure between disc surface 120 and the bearing surfaces to increase, which creates a hydrodynamic lifting force that counteracts a load force provided by suspension 116 and causes slider 118 to "fly" above and in close proximity to disc surface 120. This allows slider 118 to support head 130 in close proximity to the disc surface 120.

Drive controller 132 controls actuator mechanism 108 through a suitable connection. Drive controller 132 can be mounted within disc drive 100 or located outside of disc drive 100. During operation, drive controller 132 receives position information indicating a portion of disc 102 to be accessed. Drive controller 132 receives the position information from an operator, from a host computer, or from another suitable controller. Based on the position information, drive controller 132 provides a position signal to actuator mechanism 108. The position signal causes actuator mechanism 108 to pivot about axis 112. This, in turn, causes slider 118 and the head 130 it is supporting to move radially over disc surface 120 along path 122. Once head 130 is appropriately positioned, drive controller 132 then executes a desired read or write operation.

Figure 2:
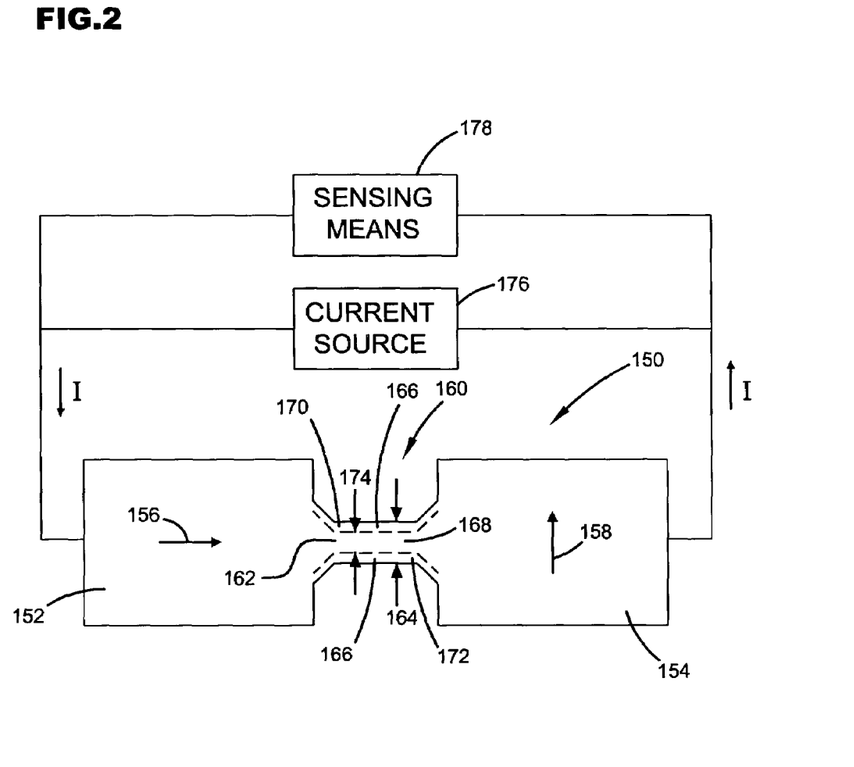
FIG. 2 is a schematic diagram of a BMR sensor in accordance with embodiments of the invention and a means for sensing the BMR effect of the sensor in response to an external magnetic field.

FIG. 2 is a schematic top view of a magnetoresistance sensor 150 in accordance with embodiments of the invention. FIG. 2 also illustrates a manner of using sensor 150 in, for example, a disc drive storage system, such as that depicted in FIG. 1. Sensor 150 can also be used in a magnetic field sensor or probe, and in other devices. Sensor 150 includes first and second magnetic leads 152 and 154 that are displaced from each other and are each formed of a magnetic and electrically conductive material. First magnetic lead 152 includes a magnetization or magnetic moment 156 and second magnetic lead 154 includes a magnetization or magnetic moment 158. One of the magnetizations, such as magnetization 156 of first magnetic lead 152, is preferably fixed or pinned in place by, for example, an adjacent anti-ferromagnetic layer or layers (not shown) through exchange coupling therewith. The other magnetization, such as magnetization 158 of second magnetic lead 154, is a free magnetization that is free to rotate in response to an external magnetic field. Free magnetization 158 is preferably biased in a preferred direction relative to pinned magnetization 156 using permanent magnets (not shown) or other methods. In accordance with one embodiment, magnetizations 156 and 158 are oriented substantially perpendicular to each other when in a quiescent state, as shown in FIG. 2.

Sensor 150 also includes a constricted junction 160 that joins first and second magnetic leads 152 and 154. Constricted junction 160 is initially formed as a non-constricted junction that includes a magnetic and electrically conductive layer 162 having a width 164 of approximately 30–60 nanometers (nm). The non-constricted junction is formed into the constricted junction 160 through implantation of ions therein, which transforms a shell portion 166 of the magnetic and electrically conductive material into a material having reduced magnetic and electrical conductivity. Ion implanted shell portion 166 at least partially surrounds a junction core 168 (indicated by dashed lines) that is formed of a remaining portion of the magnetic and electrically conductive layer 162.

Preferably, shell portion 166 adjoins one or both sides 170 and 172 to reduce the initial width 164 of the magnetic and electrically conductive layer 162 to a width 174 corresponding to junction core 168. Widths 164 and 174 are perpendicular to a length of the junction which corresponds to the distance spanned by the junction between the first and second magnetic leads 152 and 154. In accordance with one embodiment of the invention, width 174 of junction core 168 is reduced by shell portion 166 to approximately 20 nm or less. Furthermore, the volume of junction core 168 is preferably much less than the volumes of either the first or second magnetic leads 152 or 154 which are not drawn to scale in FIG. 2. Additionally, shell portion 166 can impinge upon a top and/or bottom of the initial magnetic and electrically conductive layer 162 to reduce the thickness of junction core 168.

Application of an external magnetic field to sensor 150 causes free magnetization 158 to rotate thereby changing its orientation relative to pinned magnetization 156. Such relative orientation changes cause a change in resistance across sensor 150. In general, the resistivity of sensor 150 increases as the magnetizations 156 and 158 become more anti-parallel, and the resistivity decreases as the magnetizations 156 and 158 become more parallel. The small width 174 of junction core 168 increases the sensitivity of sensor 150 to external magnetic fields as compared to typical magnetoresistance sensors, such as giant magnetoresistance sensors. Preferably, width 174 of junction core 168 is constricted to substantially less than an average unrestricted domain wall width of the magnetic material that forms junction core 168, which is generally approximately 20 nm or less. Such a constriction to junction core 168 allows sensor 150 to produce a ballistic magnetoresistance (BMR) effect, which further increases the sensitivity of sensor 150 to external magnetic fields. In general, the resistivity of sensor 150 will increase due to an increase in the resistivity of constricted junction core 168 as a result of the presence of a constricted domain wall therein, which develops when magnetizations 156 and 158 are anti-parallel. As magnetizations 156 and 158 become more parallel, the resistivity through junction core 168 decreases.

In operation, a sensing current I is generated by a current source 176, which is directed through a conductive path formed by first magnetic lead 152, junction core 168 of constricted junction 160, and second magnetic lead 154. Resistance changes across sensor 150 in response to an external magnetic field are sensed by measuring a voltage drop across sensor 150 using a sensing means 178 in accordance with known methods. When used in a disc drive storage system, such as that depicted in FIG. 1, read circuitry (not shown) can decipher the sensed resistance changes to determine the data stored on the recording medium.

Figure 3:
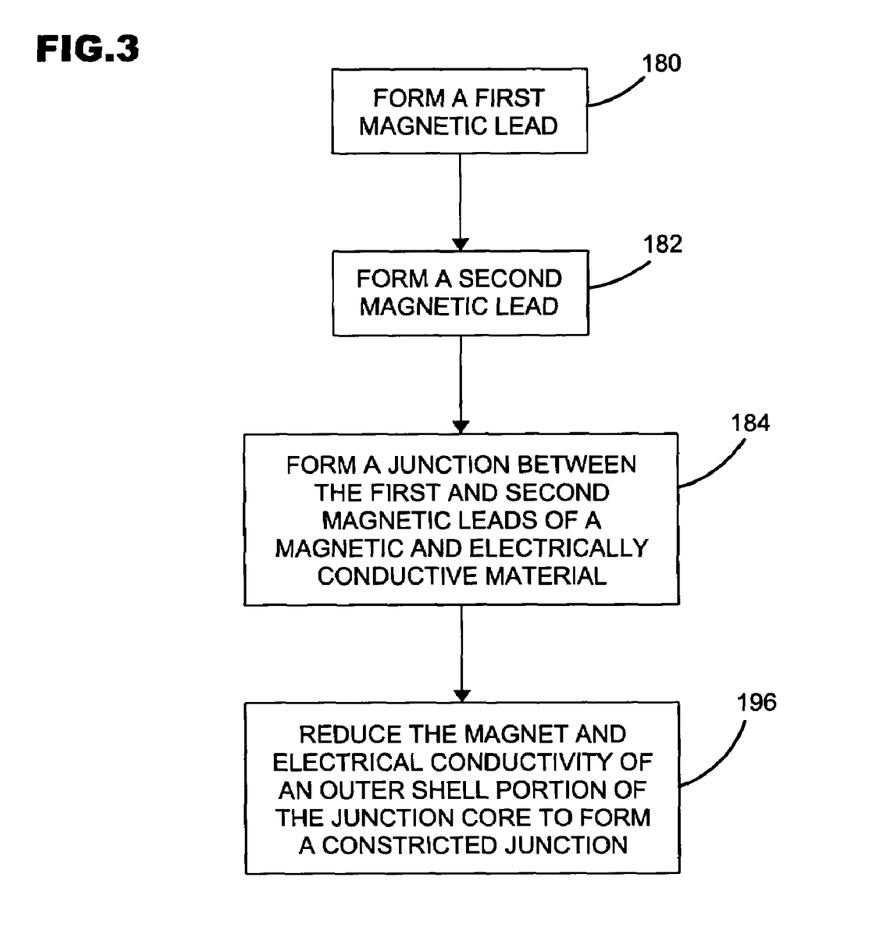
FIG. 3 is a flowchart illustrating a method of forming a BMR sensor in accordance with an embodiment of the invention.
Figure 4:
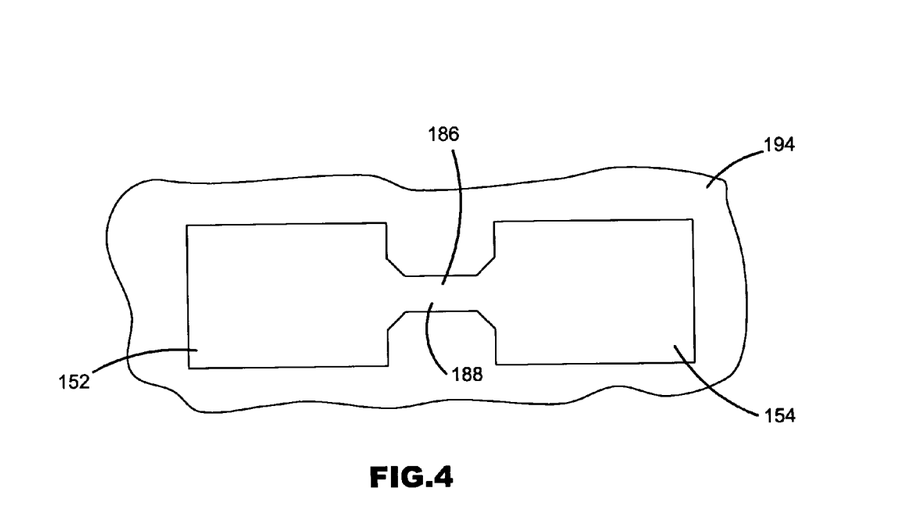
FIGS. 4–7 are schematic diagrams of various stages of manufacture of a BMR sensor in accordance with embodiments of the invention.
Figure 5:
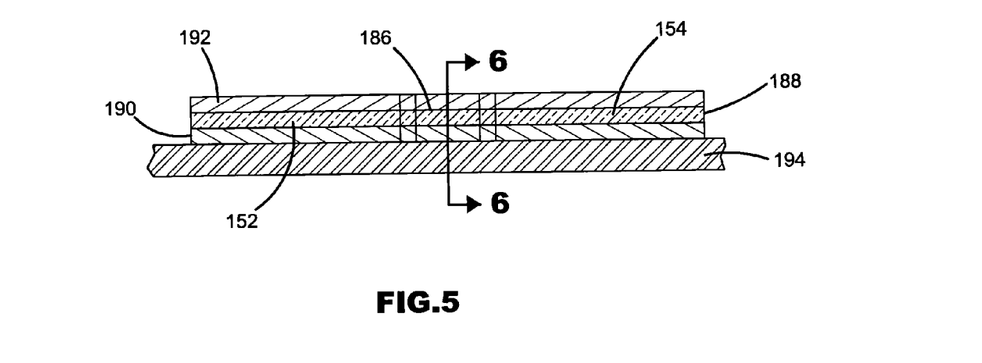

FIG. 3 is a flowchart illustrating a method of forming sensor 150 in accordance with embodiments of the invention. The method will be described with reference to FIGS. 4–7 which are schematic diagrams of various stages of the formation of sensor 150. At steps 180 and 182 of the method, first and second magnetic leads 152 and 154 are respectively formed. As explained above, first and second magnetic leads 152 and 154 are formed of a magnetic and electrically conductive material, such as iron (Fe), cobalt-iron (CoFe), cobalt-nickel-iron (CoNiFe), nickel-iron (NiFe), nickel (Ni), cobalt (Co), or other suitable magnetic and electrically conductive material. At step 184, a non-constricted junction 186, shown in FIGS. 4 and 5, is formed between first and second magnetic leads 152 and 154. Junction 186 also includes a layer of magnetic and electrically conductive material 188 such as those described above.

In accordance with one embodiment of the invention, first and second magnetic leads 152 and 154 and junction 186 are formed of a single layer of magnetic and electrically conductive material 188, as shown in FIGS. 4 and 5. Alternatively, first and second magnetic leads 152 and 154 and junction 186 can be formed at different magnetic and electrically conductive materials. If necessary, layer 188 can be formed on a non-metallic seed layer 190 and covered by a non-metallic cap layer 192, as shown in FIG. 5. First and second magnetic leads 152 and 154 and junction 186 can also be substantially coplanar, as shown in FIG. 5.

Multiple sensor structures comprising first and second magnetic leads 152 and 154 and junction 186 are preferably formed on a substrate 194, such as a semiconductor wafer. Junction 186 is formed much smaller than first and second magnetic leads 152 and 154 and preferably has a width 164 (FIG. 2) of at least 30 nm. That size constraint allows for multiple sensor structures to be formed on a wafer scale using conventional photolithographic methods. However, other methods can also be used to form the desired sensor structures, such as electron beam lithography (EBL), which generally has a resolution of 5 nm.

Figure 6:
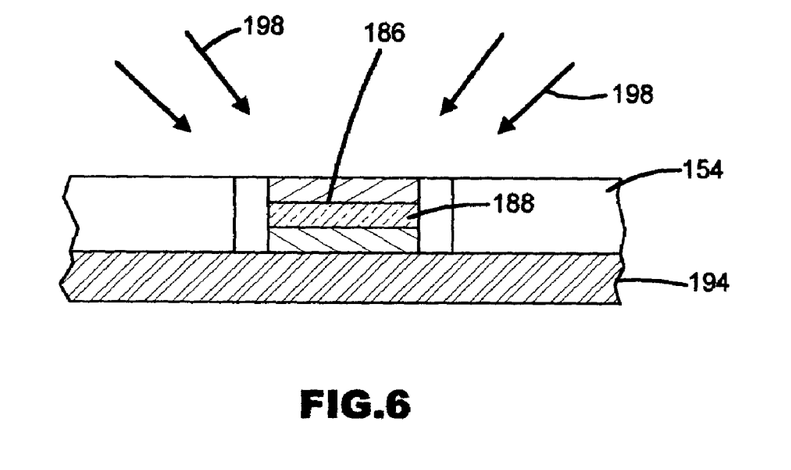
Figure 7:
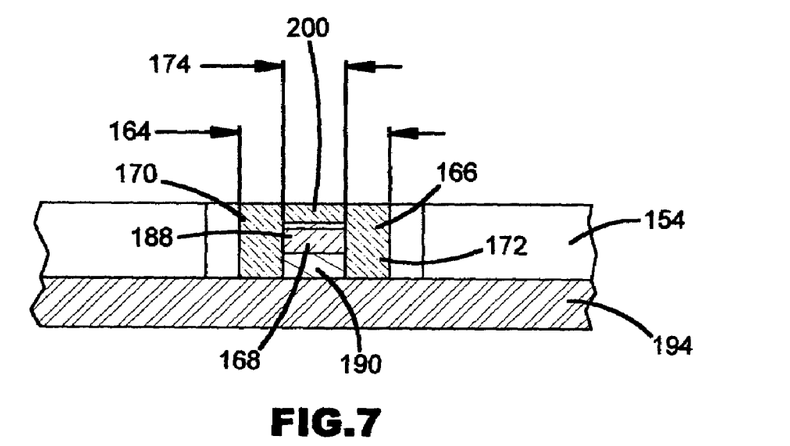

At step 196 of the method, the magnetic and electrical conductivity of outer shell portion 166 of junction 186 is reduced to form constricted junction 160 comprising a magnetic and electrically conductive junction core 168 that is at least partially surrounded by shell portion 166. This step of the method is illustrated in FIGS. 6 and 7, which are cross-sectional views of the sensor structure of FIG. 5 taken generally along line 6—6 at subsequent processing stages. The reduction to the magnetic and electrical conductivity of layer 188 is accomplished through the implantation of ions into junction 186, as illustrated by arrows 198 of FIG. 6. First and second magnetic leads 152 and 154 and other structures on substrate 194 can be protected from the ion implantation process by appropriate masking. The implanted ions can be boron, phosphorous, gallium, chromium, arsenic or other material that can provide the desired conversion of shell portion 166 of magnetic and electrically conductive layer 188 into a material having reduced magnetic and electrical conductivity, as illustrated in FIG. 7. For example, if layer 188 was formed of nickel it would have an electrical resistivity of 7.0 micro-ohm-centimeter. Following the implantation of 20% chromium ions into the nickel layer 188 increases the resistivity of the layer 188 to approximately 108 micro-ohm-centimeter. This is due to the alloying effects, which increase electron scattering by adding an impurity into the pure metal.

The implantation of ions into junction 186 can be controlled such that shell portion 166 is formed adjacent a single side 170 or 172 of junction core 168, even though it is shown as being formed around top 200, side 170 and side 172 of junction core 168. The thickness of shell portion 166 can be accurately controlled by the duration of the ion implantation process. As a result, width 164 of magnetic and electrically conductive layer 188 as initially formed can be reduced to a desired width 174, as shown in FIGS. 2 and 7. As mentioned above, width 174 is less than 20 nm and is preferably less than approximately 10 nm. Accordingly, when layer 188 of junction 186 has an initial width 164 of 50 nm, for example, shell portion 166 reduces width 164 by at least 30 nm.

The completion of the method of FIG. 3 results in the formation of a magnetoresistive sensor 150, such as that shown in FIGS. 2 and 7. Preferably, sensor 150 operates as a BMR sensor where junction core 168 of constricted junction 160 has a width 174 that is less than an average unrestricted domain wall width of the magnetic material forming junction core 168. The unrestricted domain wall width generally refers to the width of a domain wall of a large volume of the magnetic material. Thus, when junction core 168 is formed of the same magnetic material as that which forms either first or second magnetic leads 152 or 154, width 174 of junction core 168 is less than an average domain wall width of the first or second magnetic leads 152 or 154.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the MR sensor while maintaining substantially the same functionality without departing from the scope and spirit of the present invention. In addition, although the preferred embodiment described herein is directed to a MR sensor for a disc drive storage system, it will be appreciated by those skilled in the art that the teachings of the present invention can be applied to magnetic field sensors and probes and other devices without departing from the scope and spirit of the present invention.

What is claimed is:

1. A method of forming a magnetoresistive sensor comprising:
   a) forming a first magnetic lead of magnetic and electrically conductive material;
   b) forming a second magnetic lead of magnetic and electrically conductive material;
   c) forming a junction between the first and second magnetic leads, the junction formed of a magnetic and electrically conductive material; and
   d) reducing the magnetic and electrical conductivity of an outer shell portion of the junction, thereby forming a constricted junction comprising a magnetic and electrically conductive junction core that is at least partially surrounded by the outer shell portion.

2. The method of claim 1, wherein the first and second magnetic leads and the junction are substantially coplanar.

3. The method of claim 1, wherein the forming steps a) through c) include forming a single layer of magnetic and electrically conductive material, and forming the first and second magnetic leads and the junction from the single layer of magnetic and electrically conductive material.

4. The method of claim 1, wherein the junction core includes a length defined by a distance separating the first and second magnetic leads, and a width that is perpendicular to the length and is substantially less than an average unrestricted magnetic domain wall width corresponding to the magnetic material of the junction core.

5. The method of claim 4, wherein the width of the junction core is approximately 20 nanometers or less.

6. The method of claim 4, wherein the width of the junction core is defined by opposing side walls of the outer shell portion of the constricted junction.

7. The method of claim 1, wherein the reducing step d) includes implanting ions of a non-ferromagnetic element into the outer shell portion of the junction.

8. The method of claim 7, wherein one of boron, phosphorous, gallium, chromium, or arsenic ions are implanted in the outer shell portion of the junction during the reducing step d).

9. A method of forming a constricted junction for use in a magnetoresistive sensor to join first and second magnetic leads that are displaced from each other and are each formed of a magnetic and electrically conductive material, the method comprising steps of:
   a) forming a junction of magnetic and electrically conductive material joining the first magnetic lead to the second magnetic lead; and
   b) reducing the magnetic and electrical conductivity of an outer shell portion of the junction by implanting ions of a non-ferromagnetic element into the outer shell portion of the junction.

10. The method of claim 9, wherein the forming step a) includes forming the junction substantially coplanar with the first and second magnetic leads.

11. The method of claim 9, wherein the junction core includes a length defined by a distance separating the first and second magnetic leads, and a width that is perpendicular to the length and is substantially less than an average unrestricted magnetic domain wall width corresponding to the magnetic material of the junction core.

12. The method of claim 11, wherein the width of the junction core is approximately 20 nanometers or less.

13. The method of claim 11, wherein the width is defined by opposing side walls of the outer shell portion of the constricted junction.

14. The method of claim 9, wherein one of boron, phosphorous, gallium, chromium, or arsenic ions are implanted in the outer shell portion of the junction during the reducing step b).

15. A method of forming a magnetoresistive sensor comprising:
   a) forming a first magnetic lead;
   b) forming a second magnetic lead;
   c) forming a junction connecting the first and second magnetic leads; and
   d) reducing magnetic and electrical conductivity of an outer shell portion of the junction including implanting ions of a non-ferromagnetic element into the outer shell porti6n of the junction.

16. The method of claim 15, wherein the non-ferromagnetic element is selected from a group consisting of boron, phosphorous, gallium, chromium, and arsenic.

17. The method of claim 15, wherein the first magnetic lead, the second magnetic lead, and the junction are coplanar.

18. The method of claim 15, wherein the forming steps a) through c) include forming the first magnetic lead, the second magnetic lead, and the junction from a single layer of magnetic and electrically conductive material.

19. The method of claim 15, wherein the junction includes a junction core having a length defined by a distance separating the first and second magnetic leads, wherein the length is less than an average unrestricted magnetic domain wall width of the magnetic material of the junction core.

* * * * *

UNITED STATES PATENT AND TRADEMARK OFFICE
CERTIFICATE OF CORRECTION

PATENT NO. : 7,204,013 B2 Page 1 of 1
APPLICATION NO. : 10/629028
DATED : April 17, 2007
INVENTOR(S) : Yi et al.

It is certified that error appears in the above-identified patent and that said Letters Patent is hereby corrected as shown below:

Col. 8, line 35, change "porti6n" to --portion--.

Signed and Sealed this

Twelfth Day of June, 2007

JON W. DUDAS
*Director of the United States Patent and Trademark Office*